(12) United States Patent
Yeom (10) Patent No.: US 11,066,814 B2
(45) Date of Patent: Jul. 20, 2021

(54) TWO-LAYER VANITY OR SINK UNIT

(71) Applicant: Myeong Hoon Yeom, Siheung-si (KR)

(72) Inventor: Myeong Hoon Yeom, Siheung-si (KR)

( * ) Notice: Subject to any disclaimer, the term of this patent is extended or adjusted under 35 U.S.C. 154(b) by 0 days.

(21) Appl. No.: 16/880,986

(22) Filed: May 22, 2020

(65) Prior Publication Data

US 2021/0087798 A1 Mar. 25, 2021

(30) Foreign Application Priority Data

Sep. 23, 2019 (KR) .................. 10-2019-0116766

(51) Int. Cl.
*E03C 1/01* (2006.01)
*E03C 1/02* (2006.01)
*E03C 1/182* (2006.01)

(52) U.S. Cl.
CPC .............. *E03C 1/01* (2013.01); *E03C 1/023* (2013.01); *E03C 1/025* (2013.01); *E03C 1/182* (2013.01)

(58) Field of Classification Search
CPC . E03C 1/01; E03C 1/023; E03C 1/025; E03C 1/182
USPC .............................................. 4/619, 639–642
See application file for complete search history.

(56) References Cited

U.S. PATENT DOCUMENTS 9,187,882 B2* 11/2015 Masoud ................ E03C 1/01
2020/0378100 A1* 12/2020 Stammel ............... E03C 1/182

FOREIGN PATENT DOCUMENTS

| KR | 20-0219870 B1 | 4/2001 |
| KR | 10-2003-0067104 A | 8/2003 |
| KR | 10-0878378 B1 | 1/2009 |
| KR | 10-1266654 B1 | 5/2013 |
| KR | 10-2015-0123010 A | 11/2015 |
| KR | 10-2019-0075383 A | 7/2019 |

* cited by examiner

*Primary Examiner* — Tuan N Nguyen (57) ABSTRACT

Disclosed herein is a two-layer vanity unit. The two-layer vanity unit includes: a cabinet; an upper vanity unit disposed on a top of the cabinet and exposed to the outside; a lower vanity unit disposed inside the cabinet so that it is selectively put into the cabinet when not in use and withdrawn from the cabinet when in use; drain pipes connected to the upper and lower vanity units; and cold and hot water pipes connected to the upper vanity unit. Control is performed to adjust one or more of water supply and water cutoff for the upper or lower vanity unit and an amount and temperature of the available water according to an operation mode of the lever of the faucet provided on the upper or lower vanity unit, thereby controlling a type of supply of available water.

8 Claims, 13 Drawing Sheets

TWO-LAYER VANITY OR SINK UNIT

CROSS-REFERENCE TO RELATED APPLICATION

This application claims the benefit of Korean Patent Application No. 10-2019-0116766 filed on Sep. 23, 2019, which is hereby incorporated by reference herein in its entirety.

TECHNICAL FIELD

The present invention relates generally to a two-layer vanity or sink unit, and more particularly to a two-layer vanity or sink unit in which an upper vanity unit is disposed on the top of a cabinet and an auxiliary vanity unit (often referred to as a lower vanity unit) having the same function as the upper vanity unit is disposed to be selectively put into and withdrawn from the cabinet.

Furthermore, the present invention relates to a two-layer vanity or sink unit that allows the amount of available water (water used to wash hands, feet and a face, wash dishes, or the like), the temperature of available water, and the type of water supply (water cutoff, water supply, or supply direction switching) to be adjusted according to the operation of the levers (or grips) of faucets provided on the upper and lower vanity units.

TECHNICAL BACKGROUND

As prior arts that form the background of the present invention, for example, a dispenser-integrated lever structure disclosed in patent documents 1 and 2 (Korean Patent Nos. 10-0878378 and 10-1266654), which are preceding patents of the present applicant, is known.

According to the dispenser-integrated lever structure disclosed in patent documents 1 and 2, it may be possible to determine the direction of water to be discharged and the mixing ratio of cold water and hot water supplied to a faucet only by operating a lever (a handle), and cold water and hot water may be independently supplied to a shower side.

As another prior art, patent documents 3 and 4 (Korean Patent Application Publication No. 10-2019-0075383 and Korean Utility Model Registration No. 20-0219870) disclose a vanity unit that has a footrest capable of sliding in a horizontal direction in the lower side of an adult vanity unit so that a child can use the adult vanity unit.

As still another prior art serving as the background of the present invention, patent document 5 (Korean Patent Application Publication No. 10-2015-0123010) discloses a vanity unit that includes a first basin disposed at a relatively high position and suitable for use by a general user (an adult) and a second basin disposed at a position lower than the first basin and convenient for a child or wheelchair user to use and the first and second basins are integrated through a connection unit.

SUMMARY OF INVENTION

In general, vanity and sink units are installed at a suitable height based on a contractor's own standards, e.g., the average height of an average adult published via statistics, unless a purchaser (or user) requests a specific height from the contractor.

Accordingly, vanity units installed in a collective building, such as an apartment or multi-family house, are installed at a height suitable for use by a general adult, and thus a person with a small height (e.g., a child) or a wheelchair user finds it uncomfortable to use the vanity units.

The present invention has been conceived to overcome the above-described problems, and an object (a first feature) of the present invention is to provide a two-layer vanity or sink unit in which a general adult vanity unit (an upper vanity unit) is disposed on the top of a cabinet (or an accommodation space) configured to accommodate various items (household tools, sanitary items, or the like) and an auxiliary vanity unit (a lower vanity unit) configured to be selectively withdrawn from the cabinet when in use and put into the cabinet when not in use is additionally disposed in the cabinet, thereby eliminating the inconvenience of use attributable to the height of a user.

As will be more clearly understood from the description of the embodiments described below, the auxiliary vanity unit (the lower vanity unit) is disposed inside the cabinet so that the auxiliary vanity unit (the lower vanity unit) is withdrawn at a height at which a user may conveniently use the unit, and the auxiliary vanity unit (the lower vanity unit) may disposed inside the cabinet in any one of a location-adjustable form (a second feature) in which a location is variable in a vertical direction or height direction and a location-fixed form in which a location is not variable in a vertical direction.

Furthermore, another object (a third feature) of the present invention is to provide a two-layer vanity or sink unit that allows the amount, temperature and supply type (water cutoff, water supply, or supply direction switching) of available water to be appropriately adjusted or controlled according to the operation of the lever (grip) of a faucet disposed on the upper vanity unit and/or the lower vanity unit. The technical spirit (component means, and an operating principle) of the present invention will be apparent from the following description of the embodiments.

Other features, objects, and the like of the present invention will become apparent from the following description.

In order to accomplish the above objects, the present invention provides [1] a two-layer vanity unit including: a cabinet; an upper vanity unit disposed on a top of the cabinet and exposed to the outside; a lower vanity unit disposed inside the cabinet so that it is selectively put into the cabinet when not in use and withdrawn from the cabinet when in use; drain pipes connected to the upper and lower vanity units; and cold and hot water pipes connected to the upper vanity unit: wherein the type of supply of available water is controlled according to the operation mode of the lever of the faucet provided on the upper or lower vanity unit.

[2] in [1], the control of the type of supply of available water is the control of one or more of water supply and water cutoff for the upper or lower vanity unit and the amount and temperature of the available water.

[3] in [1] or [2], the operation mode of the lever of the faucet provided on the upper or lower vanity unit is any one of a water cutoff mode, a use mode, and a water discharge direction switching mode when the lever of the faucet of the upper vanity unit is operated to select the water cutoff mode, water supply to both the upper and lower vanity units are all cut off; when the lever of the faucet of the upper vanity unit is operated to select the use mode, available water is usable only in the upper vanity unit and water supply to the lower vanity unit is cut off; and when the lever of the faucet of the upper vanity unit is operated to select the water discharge direction switching mode, use of available water in the upper vanity unit is prohibited, water is supplied to the lower vanity unit, and available water is usable only in the lower vanity unit.

[4] In any one of [1] to [3], a shower hose is connected to the lower vanity unit, and water supply or water cutoff for the shower hose is performed according to the operation mode of the lever of the faucet provided on the lower vanity unit.

[5] In any one of [1] to [4], the upper vanity unit includes an upper basin configured to store and discharge water and an upper faucet configured to supply available water to the upper basin; the upper faucet includes cold and hot water supply paths, cold and hot water discharge paths, a lever configured to control a type of supply of available water, an available water discharge path configured to discharge available water, a mixing ratio of cold and hot water of which varies according to an operation mode of the lever, to the upper basin, cold and hot water connection paths configured to connect the cold and hot water supply paths with the available water discharge path, and a control plate configured to be rotated within a predetermined angular range in a horizontal direction in conjunction with an operation of the lever; and the control plate includes cold and hot water agitating grooves configured to selectively allow and block connections between the cold and hot water supply paths and the cold and hot water discharge paths and a main agitating groove configured to allow available water to flow toward the available water discharge path.

[6] In any one of [1] to [5], the lower vanity unit includes a lower basin configured to store and discharge water and a lower faucet configured to supply available water to the lower basin; the lower faucet includes cold and hot water supply paths, cold and hot water discharge paths, a lever mitigated to control a type of supply of available water, an available water discharge path configured to discharge available water, a mixing ratio of cold and hot water of which varies according to an operation mode of the lever, to the lower basin, cold and hot water connection paths configured to connect the cold and hot water supply paths with the available water discharge path, and a control plate configured to be rotated within a predetermined angular range in a horizontal direction in conjunction with an operation of the lever; and the control plate includes cold and hot water agitating grooves configured to selectively allow and block connections between the cold and hot water supply paths and the cold and hot water discharge paths and a main agitating groove configured to allow available water to flow toward the available water discharge path.

[7] In any one of [1] to [6], the lower vanity unit is configured in a location-adjustable form in which a location of the lower vanity unit is adjustable inside the cabinet in a vertical direction.

BRIEF DESCRIPTION OF THE DRAWINGS

The above and other objects, features, and advantages of the present invention will be more clearly understood from the following detailed description taken in conjunction with the accompanying drawings, in which:

FIG. 3 shows views depicting some parts constituting the support part of the faucet (the dispenser-integrated lever structure) shown in FIG. 1, in which

FIG. 9 shows views showing the arrangement of holes formed in the main bodies of upper and lower faucets and a control plate according to one embodiment of the present invention, in which

DETAILED DESCRIPTION

Specific embodiments of the present invention will be described in detail below with reference to the accompanying drawings. In this case, it should be noted that since a vanity unit and a sink unit are different in their use and installation place but their configurations and operating principles are substantially the same, the following description will be given based only on a two-layer vanity unit.

Furthermore, in one embodiment of the present invention, a faucet that is provided in an upper vanity unit is a faucet that is operated according to substantially the same principle as the faucet disclosed in patent document 1, i.e., the preceding patent of the present applicant. Accordingly, in order to allow the following embodiments to be more readily understood, first, an overview of the faucet disclosed in patent document 1 will be described with reference to FIG. 1.

Figure 1:
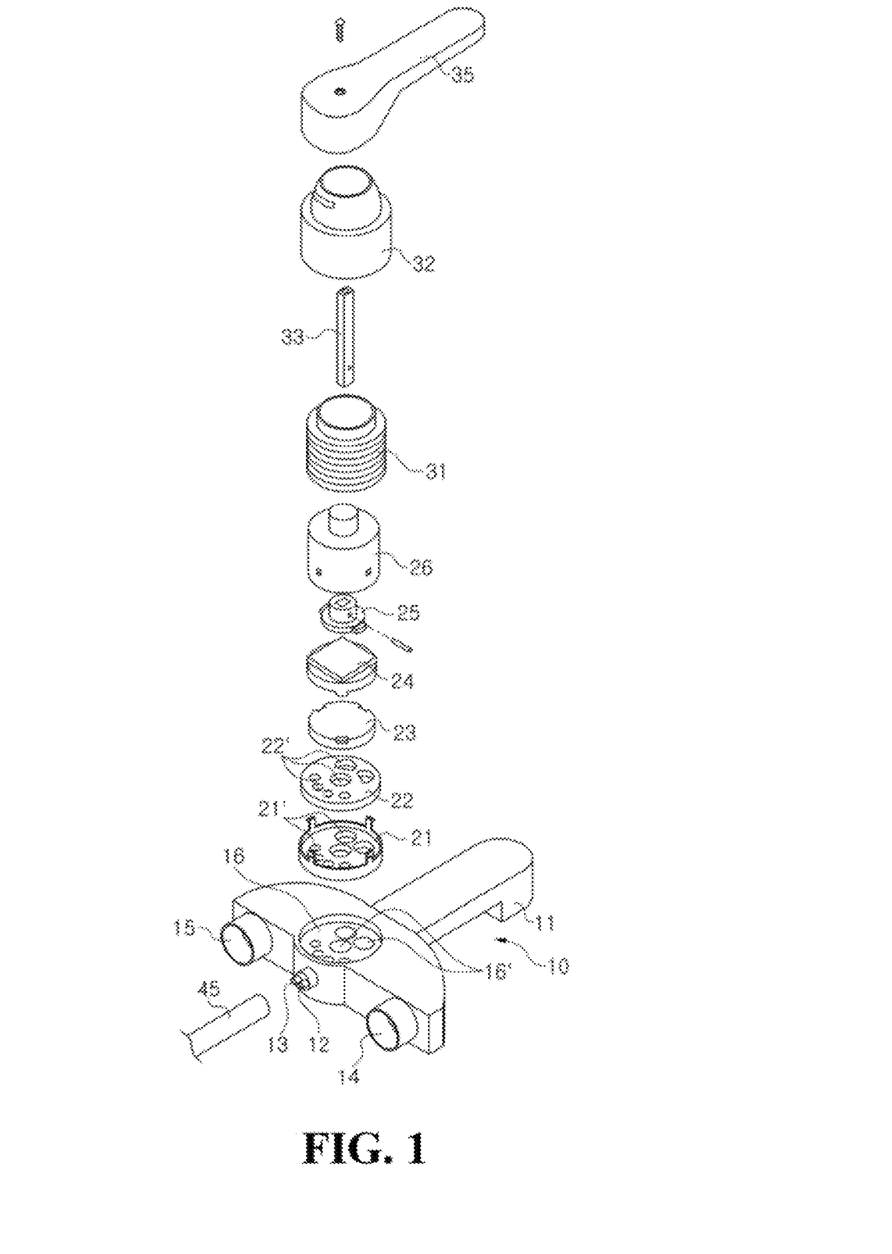
FIG. 1 is an exploded perspective view of a faucet (a dispenser-integrated lever structure) disclosed in patent document 1 (Korean Patent No. 10-0878378)

FIG. 1 is an exploded perspective view of a dispenser-integrated lever structure (corresponding to the faucet in the present invention) disclosed in patent document 1. The dispenser-integrated lever structure is a structure in which a faucet body, a support part, a case part, a shaft, and a lever grip are assembled together.

Among these components, the faucet body 10 is configured such that a faucet outlet 11 configured to discharge available water in which cold and hot water are mixed at a predetermined ratio protrudes to the front portion of the faucet body 10, cold and hot water inlets 14 and 15 are limited on the left and right sides of the rear portion of the faucet body 10, cold and hot water shower outlets 12 and 13 are formed at the center of the back of the faucet body 10, and a depressed portion 16 configured such that a plurality of holes 16' communicating with the faucet outlet 11, the cold and hot water shower outlets 12 and 13 and the cold and hot water inlets 14 and 15 are formed therein is formed at the center of the top surface of the faucet body 10.

Furthermore, a flexible hose 45 configured to send available water to a shower is connected to the cold and hot water shower outlets 12 and 13, and cold and hot water pipes configured to supply cold and hot water to the faucet body 10 are connected to the cold and hot water inlets 14 and 15, respectively.

Figure 2:
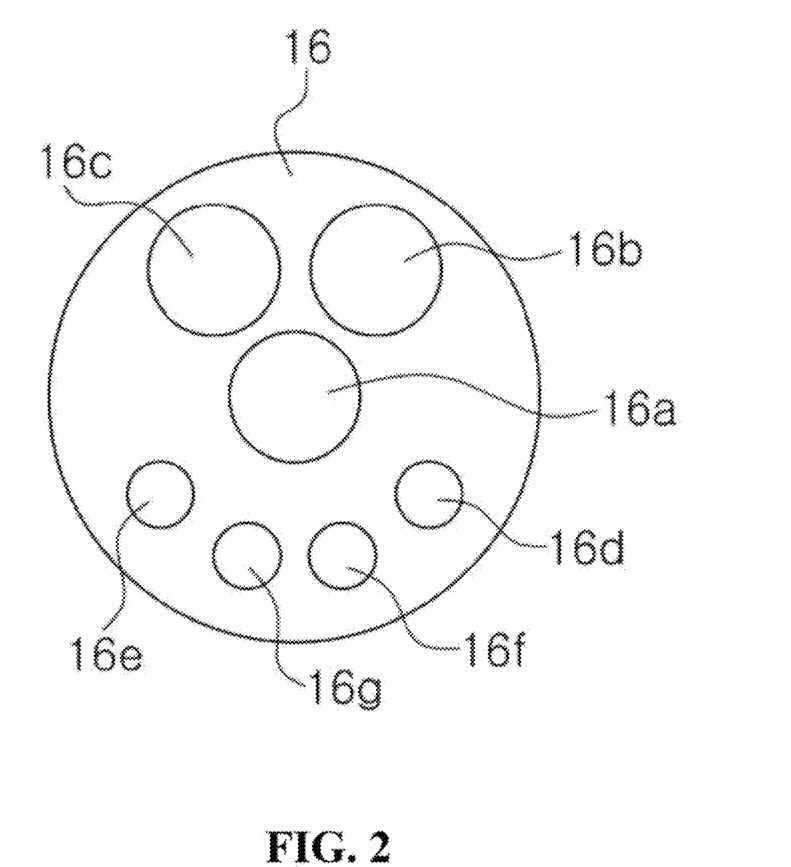
FIG. 2 is a view showing the arrangement of a plurality of holes formed in the depressed portion of the faucet (the dispenser-integrated lever structure) shown in FIG. 1.

In this case, as shown in FIG. 2, the plurality of holes 16' formed in the depressed portion 16 of the faucet body 10 includes a water outlet hole 16a configured to communicate with the faucet outlet 11, first cold and hot water inlet holes 16b and 16c configured to communicate with the cold and hot water inlets 14 and 15, respectively, second cold and hot water inlet holes 16d and 16e configured to communicate with the cold and hot water inlets 14 and 15, respectively, and cold and hot water discharge holes 16f and 16g configured to communicate with the cold and hot water shower outlets 12 and 13, respectively.

Figure 3A:
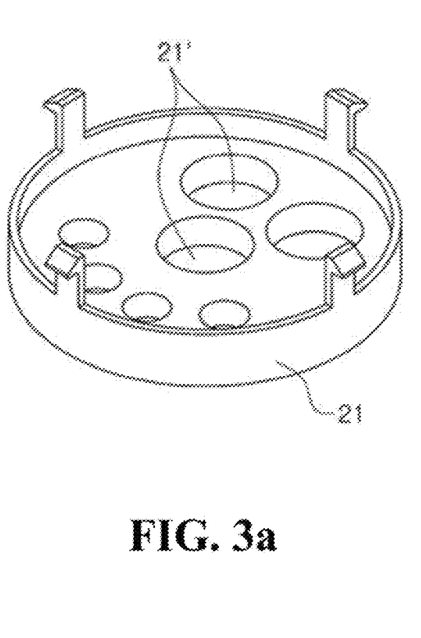
FIG. 3(a) is a perspective view of a lower support.
Figure 3B:
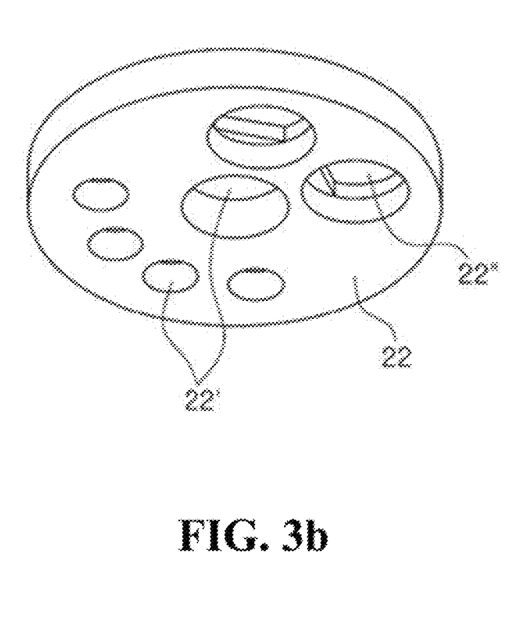
FIG. 3(b) is a perspective view of an inlet/outlet piece.

Next, as shown in FIG. 3, the support part includes: a lower support 21 disposed in the depressed portion 16 of the faucet body 10 and provided with a plurality of connection holes 21' corresponding to the plurality of holes 16' (16a~16g) of the depressed portion 16; an inlet/outlet piece 22 coupled to the lower support 21 and provided with a plurality of divided holes 22' communicating with the plurality of connection holes 21'; an agitating piece 23 configured to slide on the top surface of the inlet/outlet piece 22 and provided with a plurality of agitating grooves 23' selectively communicating with the plurality of divided holes 22'; a guide slider 24 coupled to the top surface of the agitating piece 23 and configured to be slid or rotated along with the agitating piece; a rotating drum 25 disposed on the top surface of the guide slider 24 and configured to support the guide slider so that the guide slider can move horizontally and to be rotated along with the guide slider; and an upper support 26 coupled to the top of the lower support 21 and provided with an inner protrusion that limits the rotation of the rotating drum 25.

Figure 3C:
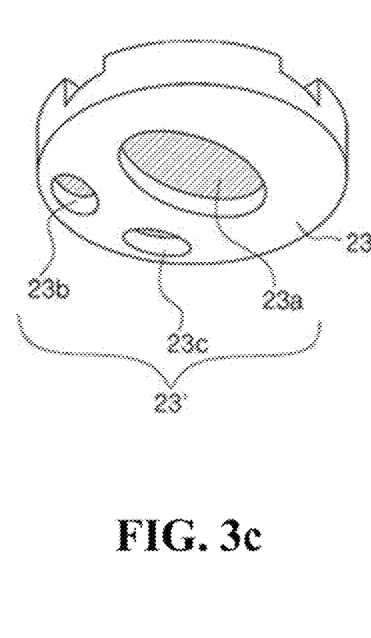
FIG. 3(c) is a perspective view of an agitating piece.

In this case, as can be seen from FIGS. 1, 2 and 3(c), the plurality of agitating grooves 23' formed in the agitating piece 23 includes a main agitating groove 23a configured to allow the first cold and hot water inlet holes 16b and 16c of the depressed portion 16 to communicate with the water outlet hole 16a and cold and hot water agitating grooves 23b and 23c configured to allow the second cold and hot water inlet holes 16d and 16e of the depressed portion 16 to communicate with the cold and hot water discharge holes 16f and 16g.

Furthermore, among the plurality of divided holes formed in the inlet/outlet piece 22, a divided hole 22" configured to communicate with the first cold and hot water inlet holes 16b and 16c of the depressed portion 16 is partially blocked in order not to communicate with the main agitating groove 23a while the agitating piece 23 is being rotated in a closed location.

Next, the case part includes: an inner case 31 located above the support part and coupled to the upper end of the depressed portion 16 of the faucet body 10; an outer case 32 located above the faucet body 10, coupled to the inner case 31, and configured to guide the lever grip 35 through its movement; and a shaft 33 coupled to the lever grip 35 on one side thereof, coupled to the top of the rotating drum 25 of the support part on the other side thereof, and configured to operate the rotating drum 25 in response to the manipulation of the lever grip 35.

Embodiment

As described above, a vanity unit and a sink unit are different in their use and installation place, but their configurations and operating principles are substantially the same.

Accordingly, although the title of the claims is "two-layer vanity or sink unit" in order to clearly express the object of application of the present invention, the two-layer vanity unit and the two-layer sink unit should be considered the same in terms of their configurations and operation effects or in terms of the higher concept "sanitary appliance equipment."

In this sense, it should be noted that although the following descriptions of the embodiments will be given based on a two-layer vanity unit, the descriptions will be also applied to a two-layer sink unit in the same manner.

Figure 4:
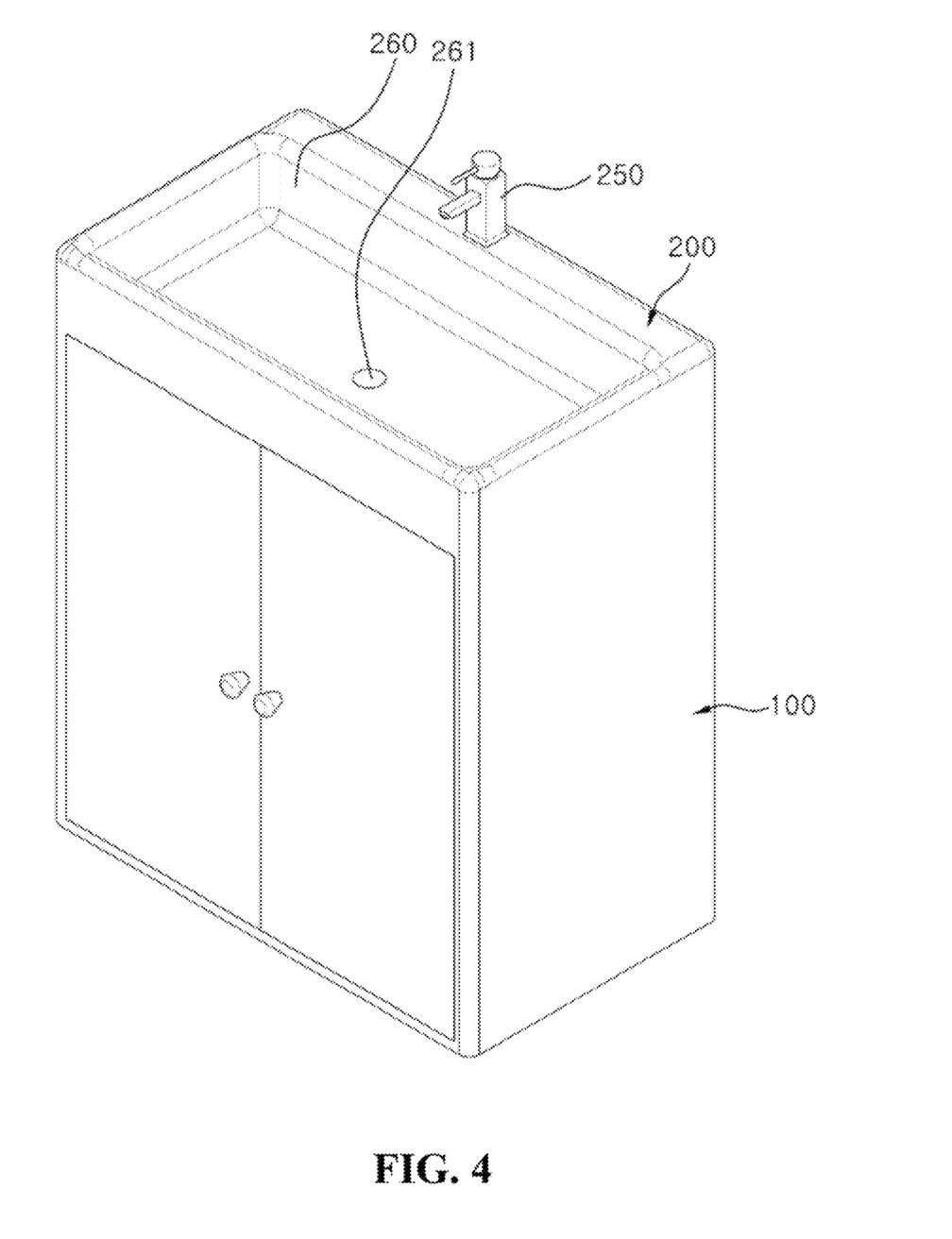
FIG. 4 is a perspective view showing a state in which a lower vanity unit is put into a cabinet (is not used) in a two-layer vanity unit according to one embodiment of the present invention.
Figure 5:
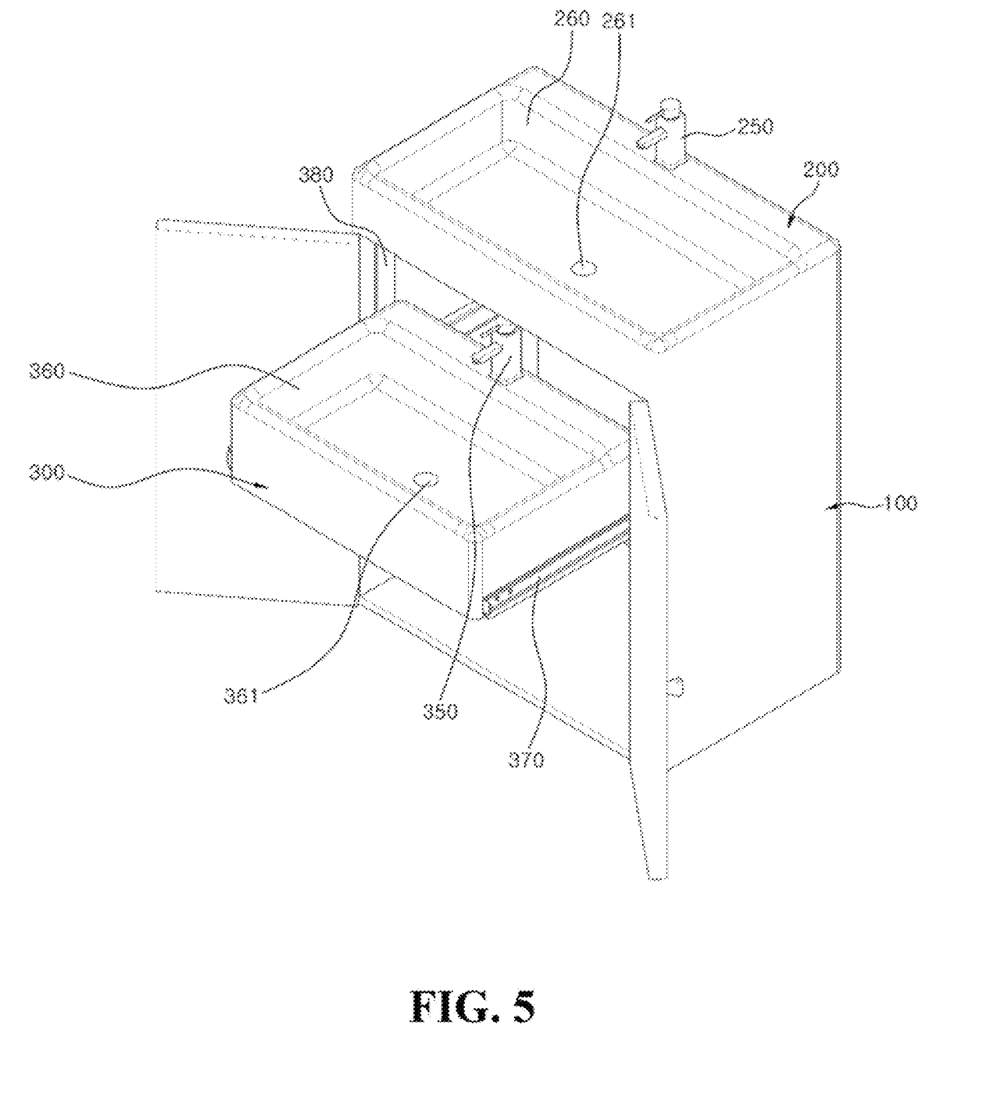
FIG. 5 is a perspective view showing a state in which the lower vanity unit is withdrawn from the cabinet in the two-layer vanity unit according to the embodiment of the present invention.

FIGS. 4 and 5 are perspective views showing a state in which a lower vanity unit is put into a cabinet (is not used) in a two-layer vanity unit according to one embodiment of the present invention and a state in which the lower vanity unit is withdrawn from the cabinet, respectively.

The two-layer vanity unit according to the present embodiment includes a cabinet 100, an upper vanity unit 200 disposed on the top of the cabinet 100 and exposed to the outside, and a lower vanity unit 300 disposed inside the cabinet 100.

Although two hinged doors are disposed on both sides of the front surface of the cabinet 100 in the present embodiment, a single hinged door may be used to selectively open and close the cabinet, or the cabinet may be selectively opened and closed by a single shutter that is selectively opened and closed in a vertical direction.

Furthermore, although not shown in FIGS. 4 and 5, drain pipes are connected to the upper and lower vanity units 200 and 300, respectively, and the cold and hot water pipes are connected to the upper vanity unit 200.

The drain pipes allow the available water used in the upper and lower vanity units 200 and 300 to be drained toward a sewer pipe. One-side ends of the drain pipes are connected to the drainage holes 261 and 361 of the upper and lower vanity units 200 and 300, and the other-side ends of the drain pipes communicate with a sewer pipe. In another embodiment, the other-side end of the drain pipe connected to the lower vanity unit 300 may be connected to the drain pipe of the upper vanity unit 200 without being connected to the sewer pipe.

Meanwhile, the drain pipe connected to the upper vanity unit 200 may be a flexible pipe or an inflexible pipe, but the drain pipe connected to the lower vanity unit 300 is preferably a flexible pipe.

Furthermore, each of the upper and lower vanity units 200 and 300 includes an upper or lower basin 260 or 360 configured to store and discharge water and an upper or lower faucet 250 or 350 configured to supply available water to the upper or lower basin 260 or 360.

Figure 6:
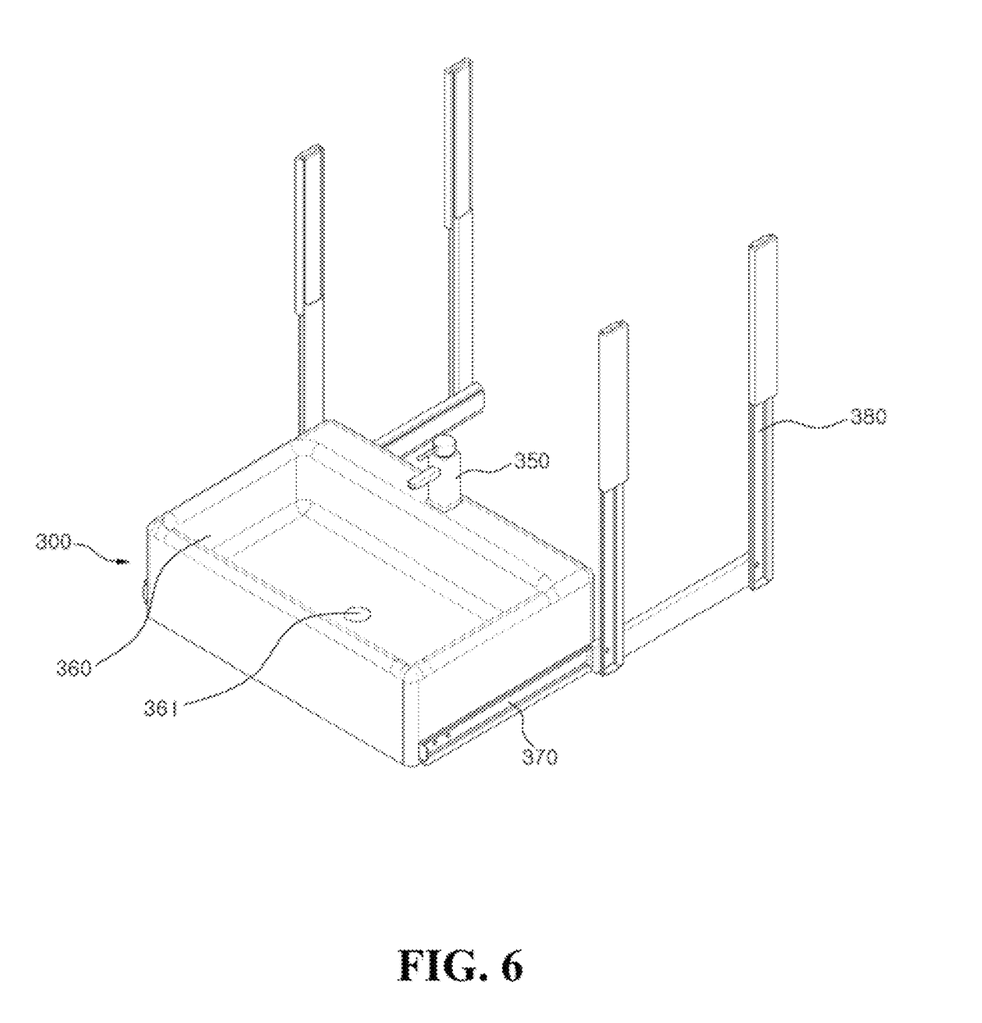
FIG. 6 is a perspective view showing a state in which a lifting mechanism and a withdrawal mechanism are coupled to a lower vanity unit according to one embodiment of the present invention.

In one embodiment of the present invention, a withdrawal mechanism 370 and a lifting mechanism 380 are coupled to the left and right sides of the lower vanity unit 300, as shown in FIG. 6.

More specifically, the withdrawal mechanism 370 includes an assembly of horizontal rails and horizontal sliders commonly found in a desk drawer, etc., and the lifting mechanism 380 includes an assembly of vertical rails and vertical sliders.

Accordingly, the lifting mechanism 380 according to one embodiment may be considered to be the same as a mechanism obtained by rotating the withdrawal mechanism 370 by 90°.

In order to allow the lower vanity unit 300 to be lifted in the cabinet 100 and to be withdrawn from the cabinet 100, the horizontal rails of the drawing mechanism 370 are fastened to the vertical sliders of the lifting mechanism 380.

As a structure different from the one embodiment, gears (pinions) are further provided on the horizontal rails of the withdrawal mechanism 370, whereas racks with which the gears are rotatably engaged may be employed as the lifting mechanism 380. The gears may be rotated manually or electrically. In the case of manual operation, handles or the like need to be provided on gear sides. In the case of electric operation, the gears need to be coupled to the motor shafts of electric motors.

Meanwhile, ball screw mechanisms are disposed between the horizontal rails of the withdrawal mechanism 370 and the vertical sliders of the lifting mechanism 380 so that ball nuts are moved in vertical directions, and the lower vanity unit 300 may be moved to a desired location, stay at the location, and be only allowed to be withdrawn in the horizontal direction by a configuration in which the horizontal rails of the withdrawal mechanism 370 and the vertical sliders of the lifting mechanism 380 are fastened to the ball nuts.

As another embodiment, it may be also possible to employ only the withdrawal mechanism 370 without employing the lifting mechanism 380, in which case it may be impossible to adjust the height after the lower vanity unit 300 has been installed in the cabinet.

Next, the control of available water supply mode will be described with reference to FIGS. 7 to 11.

Figure 7:
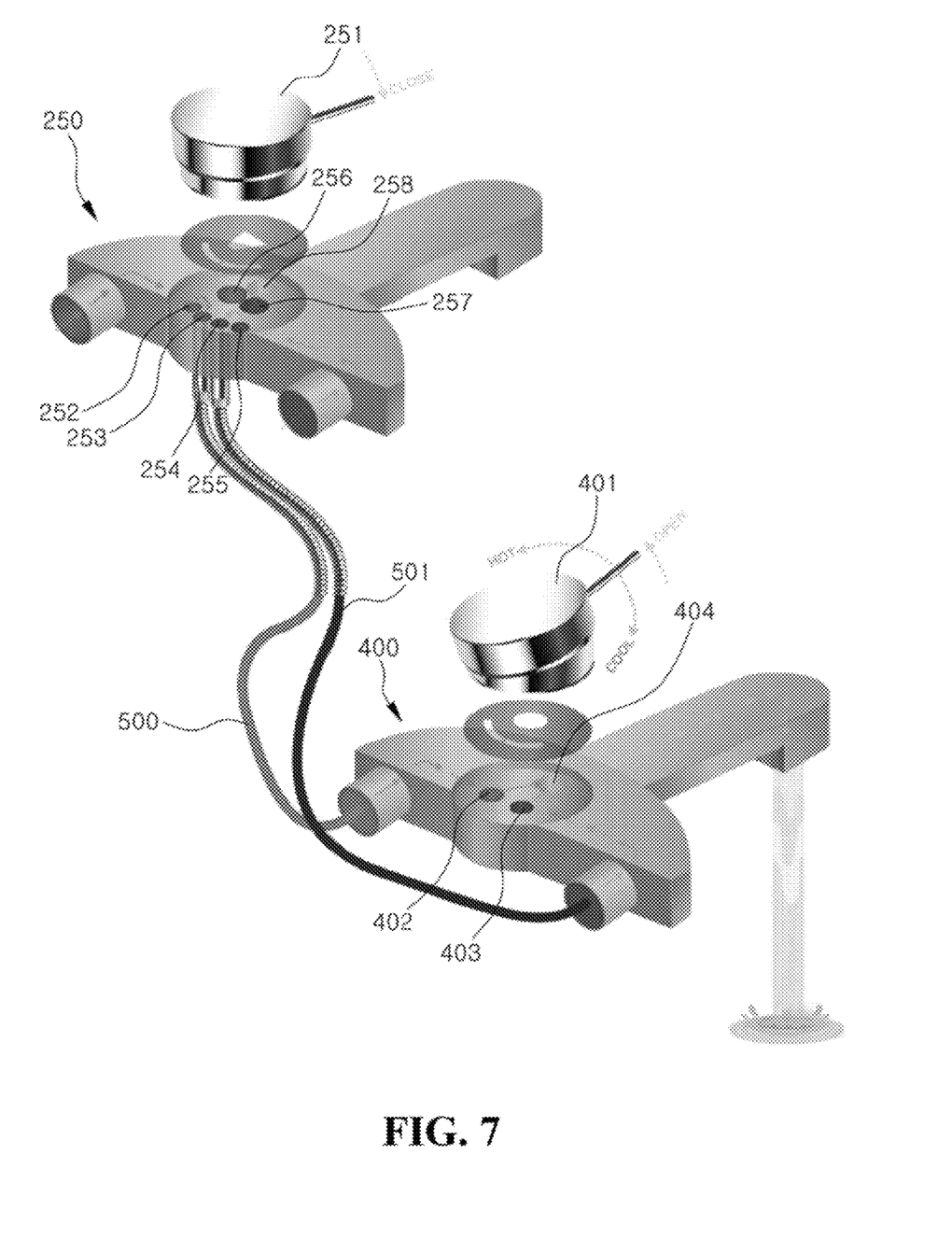
FIG. 7 is a schematic diagram showing a fluid connection state between upper and lower faucets according to one embodiment of the present invention.

FIG. 7 shows a case where an upper faucet 250 is provided on an upper vanity unit 200 and a general faucet 400 is provided on a lower vanity unit 300 according to an embodiment of the present invention. In other words, this drawing is a schematic diagram showing a fluid connection (communication) state between the upper faucet 250 and the general faucet 400.

The upper faucet 250 has a structure substantially the same as that of the dispenser-integrated lever structure of Patent Document 1 described in FIGS. 1 to 3 except for the locational relationship of holes (passages and flow paths) related to fluid connection.

In the upper faucet 250 according to one embodiment, the plurality of flow paths related to fluid connection includes cold and hot water supply paths 255 and 252, cold and hot water discharge paths 254 and 253, an available water discharge path 258 configured to discharge available water, the mixing ratio of cold and hot water of which varies according to the operation mode of a lever 251, to the upper basin 260, and cold and hot water connection paths 257 and 256 configured to connect the cold and hot water supply paths 255 and 252 with the available water discharge path 258.

The upper faucet 250 is controlled according to the operation mode of the lever 251, i.e., any one of a water cutoff mode, a use mode, and a water discharge direction switching mode. In the use mode, the discharge quantity and water temperature of available water are controlled.

In FIG. 7, the upper faucet 250 is operated in the water discharge direction switching mode. In this case, the lever 251 is lowered to the lowest position so that the front end portion of the lever 251 is closest to the main body of the upper faucet 250. In the general faucet 400, this state is a closed state, i.e., a water cutoff mode in which water does not flow through the outlet of the faucet.

In connection with this, in one embodiment of the present invention, the front end of the lever 251 of the upper faucet 250 is placed at the lowest location in both the water cutoff mode and the water discharge direction switching mode. The water cutoff mode and the water discharge direction switching mode are selected by the rotation of the lever 251 that is performed in the horizontal direction. For example, when the lever 251 is located at the center of a rotatable range (a location that divides a rotation angle range into halves) in a horizontal plane, the water discharge direction switching mode is selected. In contrast when the lever 251 is located at an angular position spaced apart from the center position by ±45°, the water cutoff mode is selected.

When the upper faucet 250 is in the water discharge direction switching mode, the hot water supply path 252 and the hot water discharge path 253 are fluid-connected (communicate with each other), and hot water flows into the hot water inflow path 402 of the general faucet 400 provided on the lower vanity unit 300 through a hot water discharge pipe 500 connected to the hot water discharge path 253. Furthermore, in this case, the cold water supply path 255 and cold water discharge path 254 of the upper faucet 250 are fluid-connected (communicate with each other), and cold water is supplied to the cold water inflow path 403 of the general faucet 400 provided on the lower vanity unit 300 through the cold water discharge pipe 501 connected to the cold water discharge path 254.

Furthermore, in the state in which cold water and hot water have been supplied to the general faucet 400 of the lower vanity unit 300 as described above, when the front end of the lever 401 provided in the general faucet 400 is lifted up, the cold water and the hot water having reached the cold and hot water inflow paths 402 and 403 flow toward the available water discharge path 404, are mixed together, and are discharged to the lower basin through the outlet of the faucet.

In this case, the amount of water to be discharged is adjusted according to the degree to which the lever 401 is lifted up, and the mixing ratio of cold water and hot water is varied according to the degree to which the lever 401 is rotated in the horizontal direction within the rotatable range, thereby adjusting the temperature of water.

Figure 8A:
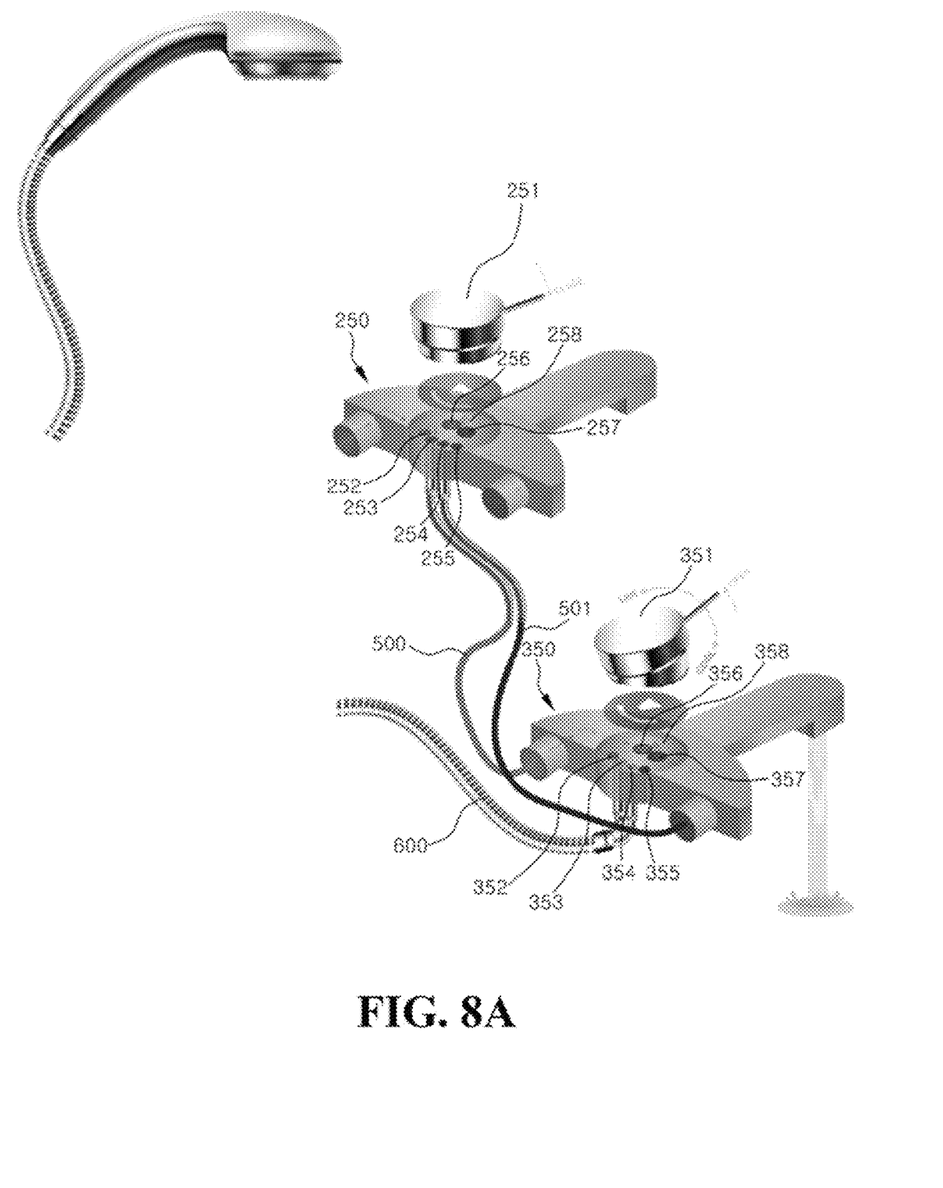
FIG. 8a is a schematic diagram showing a fluid connection state between upper and lower faucets and a shower according to another embodiment of the present invention, which shows a state in which the lower faucet is in use.

Next, FIG. 8*a* is a schematic diagram showing a fluid connection state between upper and lower faucets 250 and 350 according to another embodiment of the present invention. This drawing is a schematic diagram of a state in which the lower faucet 350 is in use.

Both the upper and lower faucets 250 and 350 have the same structure as the upper faucet 250 described in FIG. 7.

Accordingly, when the upper faucet 250 is in the water discharge direction switching mode, the hot water supply path 252 and the hot water discharge path 253 are fluid-connected (communicate with each other), hot water flows into the hot water supply path 352 of the lower faucet 350 provided on the lower vanity unit 300 through the hot water discharge pipe 500 connected to the hot water discharge path 253, and cold water is supplied to the cold water supply path 355 of the lower faucet 350 through the cold water discharge pipe 501 connected to the cold water discharge path 254.

In the state in which cold and hot water have reached the cold and hot water supply paths 355 and 352 of the lower faucet 350, when the lever 351 of the lower faucet 350 is operated to select the use mode, the cold and hot water supply paths 355 and 352, cold and hot water connection paths 358 356 and available water discharge path 358 of the lower faucet 350 are fluid-connected, and available water is discharged through the faucet outlet of the lower faucet 350.

Meanwhile, when the lower faucet 350 is operated to select the water discharge direction switching mode, available water is discharged toward a shower hose 600.

Figure 8B:
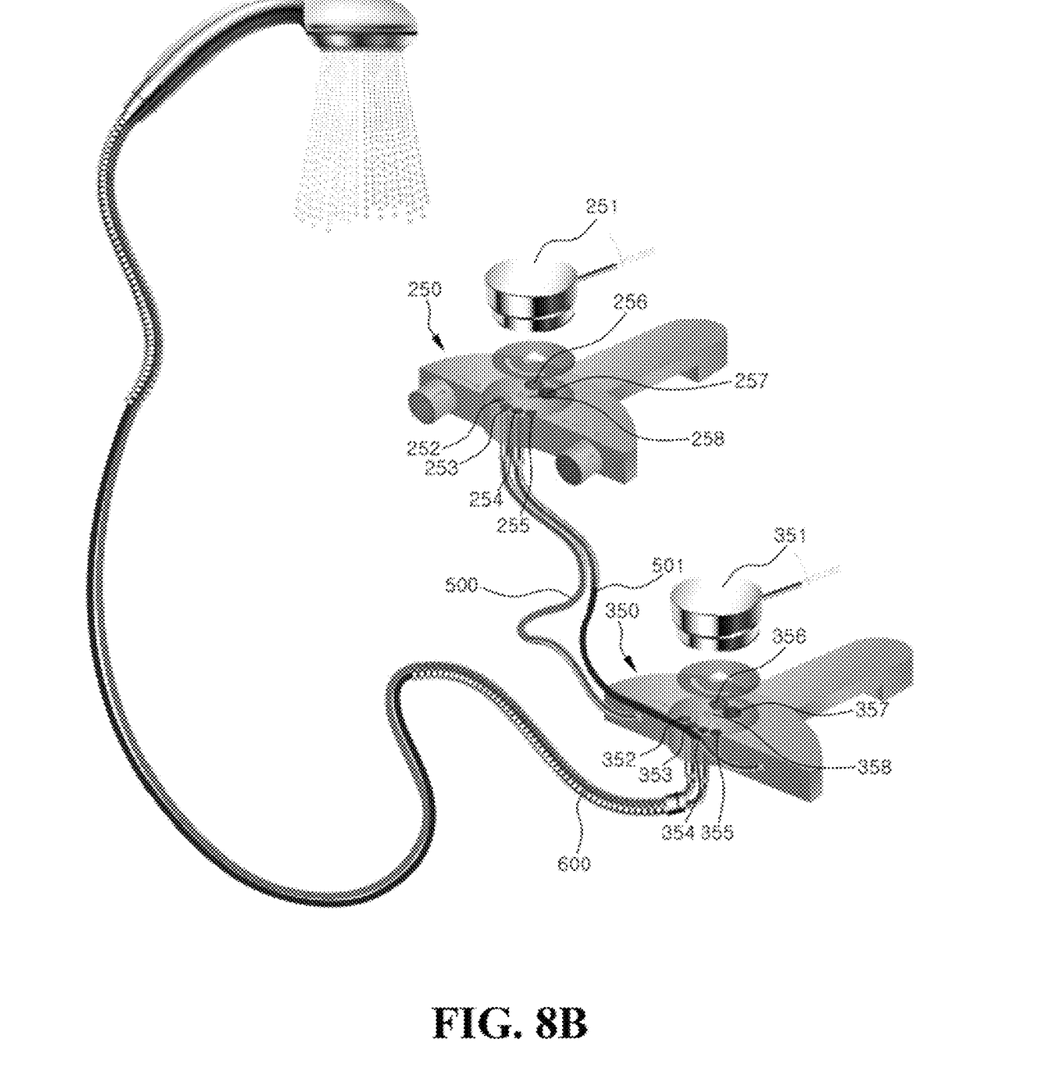
FIG. 8b is a schematic diagram showing a fluid connection state between upper and lower faucets 250 and 350 and a shower according to still another embodiment of the present invention, which shows a state in which the shower is in use.

Next, FIG. 8b is a schematic diagram showing a fluid connection state between upper and lower faucets 250 and 350 and a shower according to another embodiment of the present invention. This drawing is a schematic diagram of a state in which the shower is in use.

The upper and lower faucets 250 and 350 shown in FIG. 8b have the same structures as those of the dispenser-integrated lever of Patent Document 1 described in FIGS. 1 to 3.

The upper and lower faucets 250 and 350 are different merely in the locational relationship between the cold and hot water connection paths 257, 256, 357 and 356 and the available water discharge paths 258 and 358.

When both the upper and lower faucets 250 and 350 of FIG. 8b are operated to select the water discharge direction switching mode, available water is supplied to the shower hose 600 connected to the cold and hot water discharge paths 354 and 353 of the lower faucet 350.

Although the amount of water to be discharged and the temperature of the water may be adjusted by operating the lever 351 of the lower faucet 350, the adjustment may be performed on a shower head side if a shower head is provided with an adjusting means.

Figure 9A:
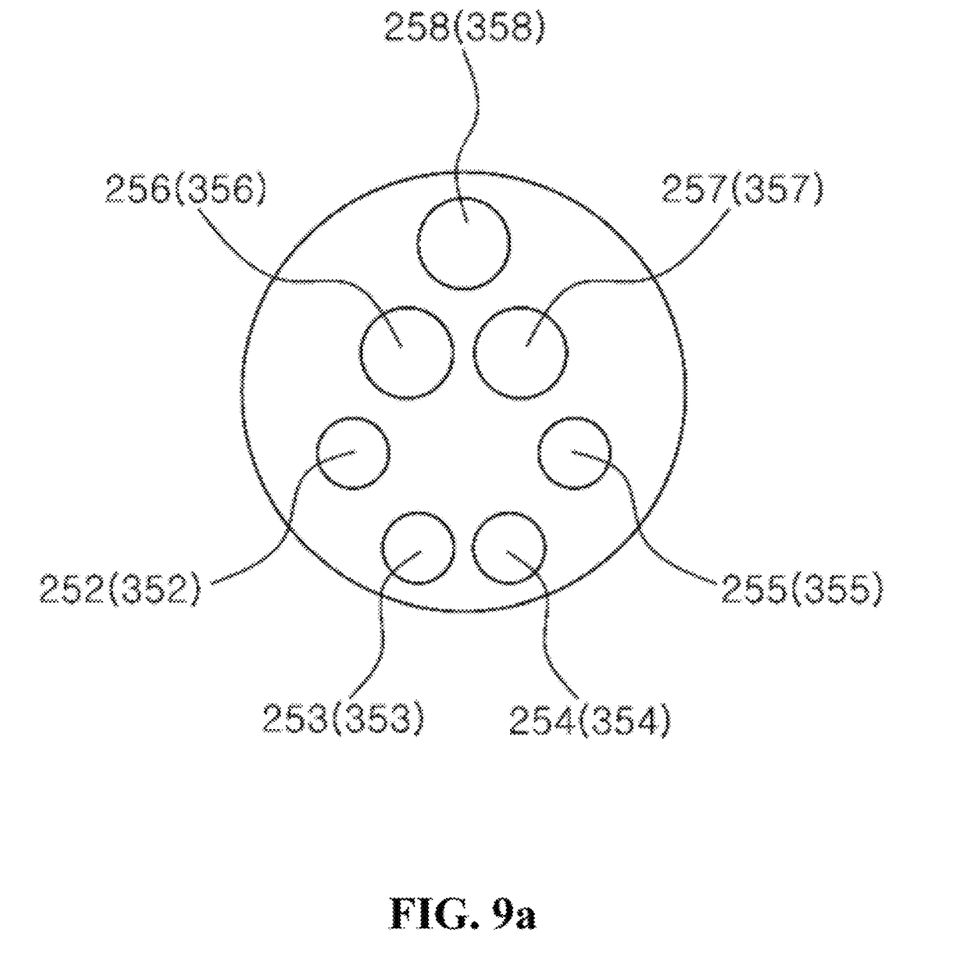
FIG. 9a is a view showing the arrangement of holes formed in the depressed portion of the main body.
Figure 9B:
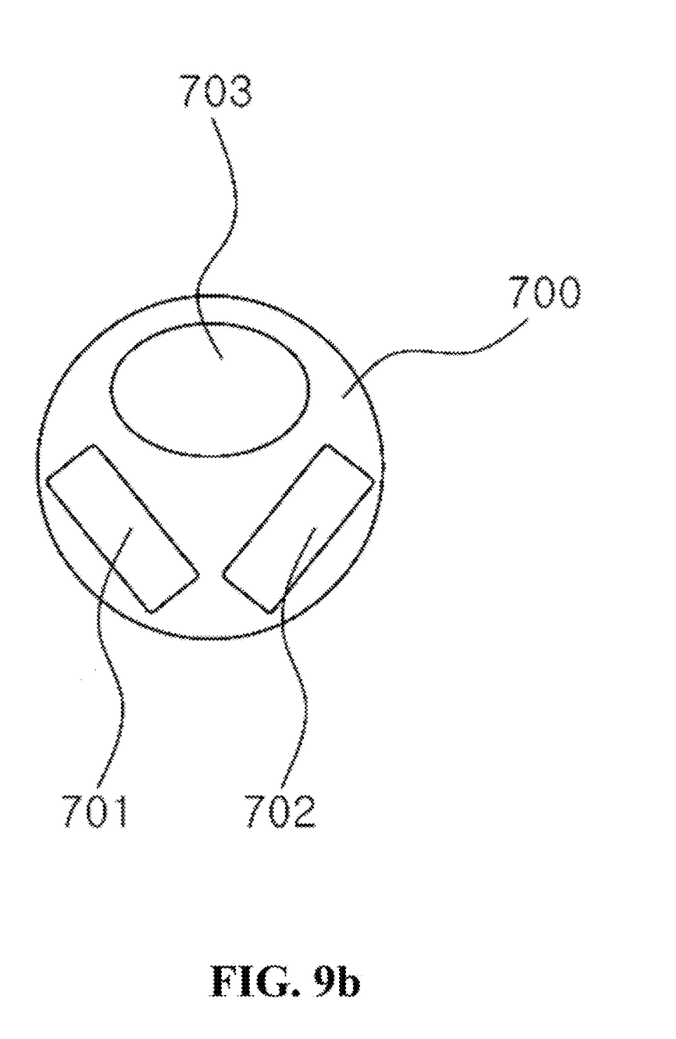
FIG. 9(b) is a view showing the arrangement of holes formed in the control plate to be coupled to the depressed portion of the main body of the faucet.

Next, FIG. 9 shows views showing the arrangement of holes (passages and flow paths) formed in the main bodies of the upper and lower faucets 250 and 350 and a control plate 700 according to an embodiment of the present invention. FIG. 9a is a view showing the arrangement of holes (passages and flow paths) formed in the depressed portion of the main body, and FIG. 9(b) is a view showing the arrangement of holes (passages and flow paths) formed in the control plate 700.

In FIGS. 1 to 3, seven holes (passages and flow paths) are formed in the depressed portion of the faucet body, a lower support, and an inlet outlet piece, and three agitating grooves are formed in an agitating piece 23.

As described above, the upper and lower faucets 250 and 350 of the present invention have substantially the same configuration as the faucet (dispenser-integrated lever structure) of Patent Document 1, except for the locational relationship between holes (passages and flow paths).

Accordingly, the control plate 700 having cold and hot water agitating grooves 701 and 702 and a main agitating groove 703 corresponds to the agitating piece 23 of patent document 1, and upper and lower faucets 250 and 350 according to one embodiment are provided with a lower support, an inlet/outlet piece and a depressed portion in each of which seven holes are formed.

Figure 10:
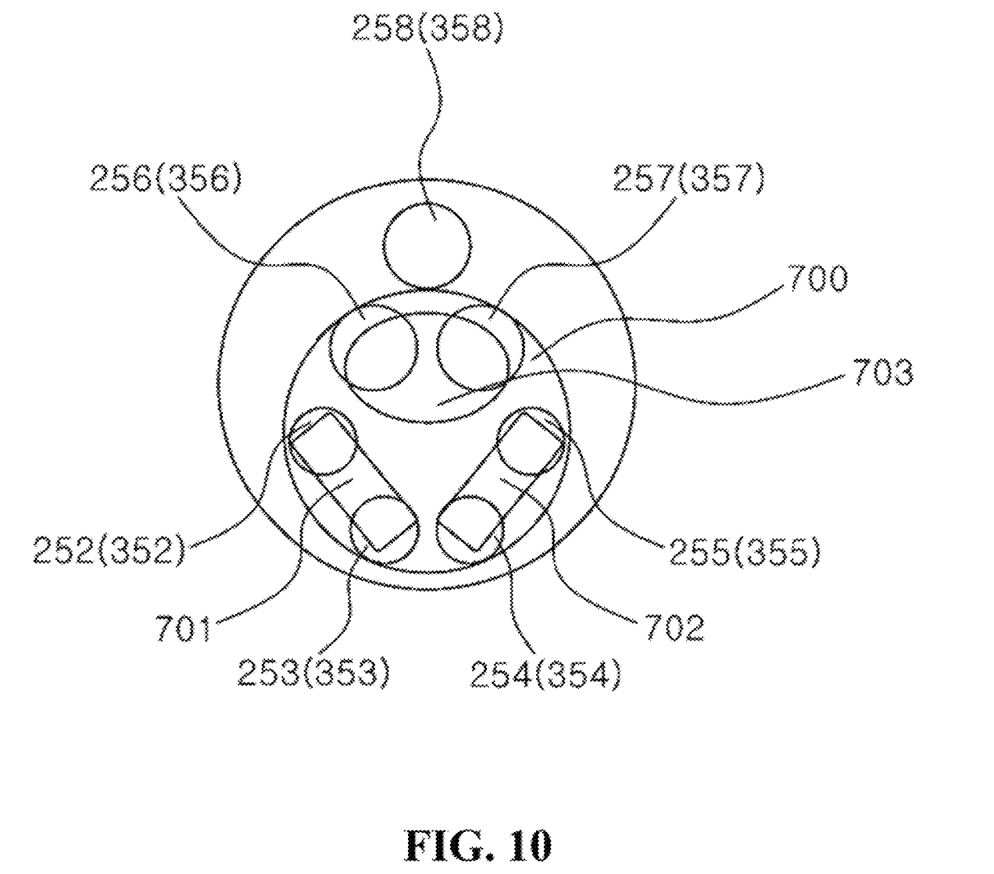
FIG. 10 is a view showing a locational relationship between the plurality of holes formed in the main body of the faucet and the plurality of agitation grooves formed in the control plate when the faucet is in a water discharge direction switching mode.
Figure 11:
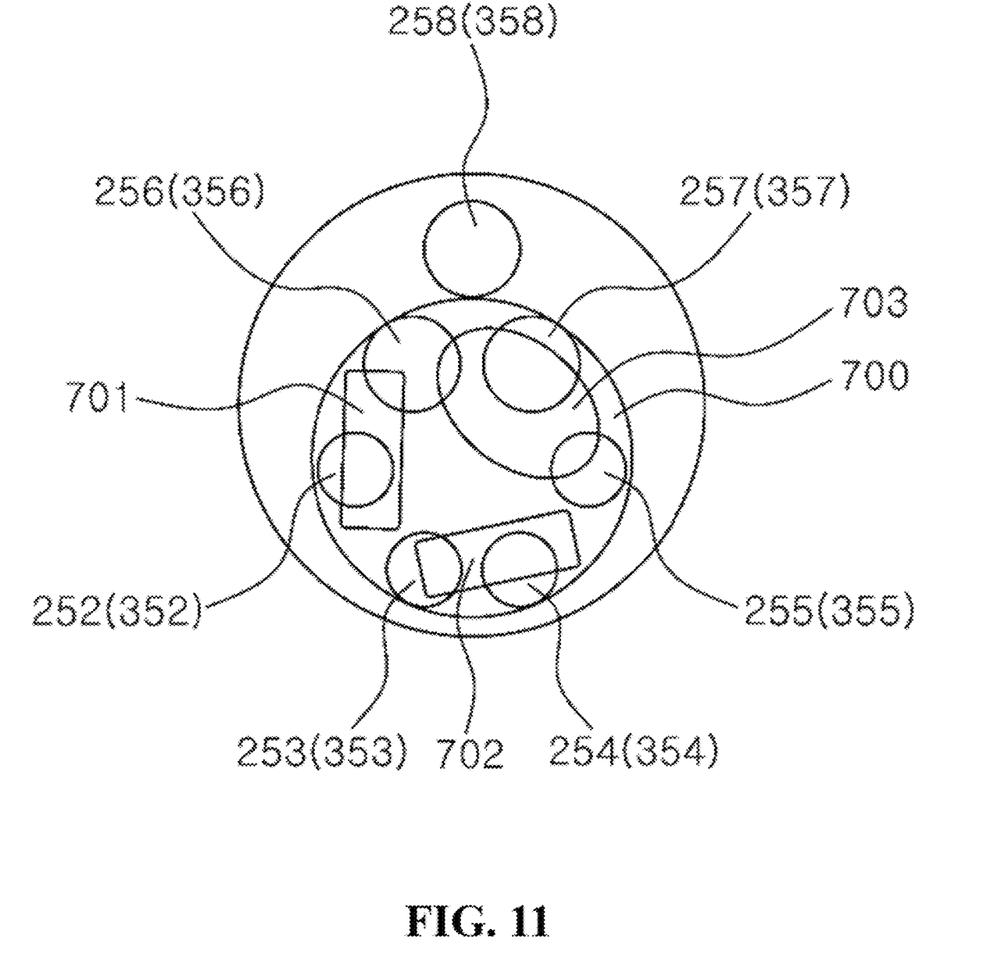
FIG. 11 is a view showing a locational relationship between the plurality of holes formed in the main body of the faucet and the plurality of agitation grooves formed in the control plate when the faucet is in a water cutoff mode.

FIGS. 10 and 11 show the switching of a control mode according to the state in which the seven flow paths (holes) and three agitation grooves intersect in upper and lower faucets according to one embodiment of the present invention. FIG. 10 is a view showing a locational relationship between the plurality of holes formed in the main body of the faucet and the plurality of agitation grooves formed in the control plate 700 in the case of a water discharge direction switching mode. FIG. 11 is a view showing a locational relationship between the plurality of holes formed in the main body of the faucet and the plurality of agitation grooves formed in the control plate 700 in the case of a water cutoff mode.

The type of water supply varies depending on the pattern in which seven holes and three agitation grooves intersect each other by the operation of the lever. Since this has been disclosed in the applicant's preceding patents (patent documents 1 and 2) in detail, a detailed description thereof will be omitted here.

The two-layer vanity or sink unit according to the present invention includes the upper vanity unit fastened to a height convenient for an average adult to use and the lower vanity unit disposed at a height convenient for a wheelchair user or a user with a small height to use, thereby providing an advantage in which an individual user may conveniently use it regardless of height. This allows the first feature of the present invention to be achieved.

Furthermore, the two-layer vanity or sink unit according to the present invention allows the lower vanity unit to be moved inside the cabinet in a vertical direction (or a height direction), thereby allowing adjustment to be performed such that the lower vanity unit may be withdrawn at an optimum use height (an optimum use location) based on the height of a user. This allows the second feature of the present invention to be achieved.

Moreover, the two-layer vanity or sink unit according to the present invention allows the amount, temperature and supply type (water cutoff, water supply, or supply direction switching) of available water to be adjusted or controlled according to the operation of the levers (grips) of the faucets disposed on the upper vanity trait and the lower vanity unit. This allows the third feature of the present invention to be achieved.

While some embodiments illustrating the technical spirit of the present invention have been described above based on the drawings, the present invention is not limited to the configurations and operations described above, but those skilled in the art will appreciate that many changes and modifications may be made to the present invention without departing from the scope of the technical spirit described in the description and claims of the invention. Therefore, all such suitable changes and modification and equivalents should be considered to fall within the scope of the present invention.

What is claimed is:
1. A two-layer vanity unit comprising:
a cabinet;
an upper vanity unit disposed on a top of the cabinet and exposed to an outside;
a lower vanity unit disposed inside the cabinet so that it is selectively put into the cabinet when not in use and withdrawn from the cabinet when in use;
drain pipes connected to the upper and lower vanity units; and
cold and hot water pipes connected to the upper vanity unit;

wherein control is performed to adjust one or more of a water supply and a water cutoff for the upper or lower vanity unit and an amount and temperature of the available water according to an operation mode of a lever of a faucet provided on the upper or lower vanity unit, which is any one of a water cutoff mode, a use mode, and a water discharge direction switching mode, thereby controlling a type of supply of available water;

wherein, when the lever of the faucet of the upper or lower vanity unit is operated to select the water cutoff mode, water supply to both the upper and lower vanity units are all cut off;

wherein, when the lever of the faucet of the upper or lower vanity unit is operated to select the use mode, available water is usable only in the upper vanity unit and water supply to the lower vanity unit is cut off; and wherein, when the lever of the faucet of the upper or lower vanity unit is operated to select the water discharge direction switching mode, use of available water in the upper vanity unit is prohibited, water is supplied to the lower vanity unit, and available water is usable only in the lower vanity unit.

2. The two-layer vanity unit of claim 1,
wherein a shower hose is connected to the lower vanity unit, and the water supply and the water cutoff for the shower hose is performed according to the operation mode of the lever of the faucet provided on the upper or lower vanity unit.

3. The two-layer vanity unit of claim 2, wherein:
the upper vanity unit includes an upper basin configured to store and discharge water and the faucet is an upper faucet configured to supply available water to the upper basin;
the upper faucet includes cold and hot water supply paths, cold and hot water discharge paths, the lever configured to control a type of supply of available water, an available water discharge path configured to discharge available water, a mixing ratio of cold and hot water of which varies according to an operation mode of the lever, to the upper basin, cold and hot water connection paths configured to connect the cold and hot water supply paths with the available water discharge path, and a control plate configured to be rotated within a predetermined angular range in a horizontal direction in conjunction with an operation of the lever; and
the control plate includes cold and hot water agitating grooves configured to selectively allow and block connections between the cold and hot water supply paths and the cold and hot water discharge paths and a main agitating groove configured to allow available water to flow toward the available water discharge path.

4. The two layer vanity unit of claim 2, wherein:
the lower vanity unit includes a lower basin configured to store and discharge water and the faucet is a lower faucet configured to supply available water to the lower basin;
the lower faucet includes cold and hot water supply paths, cold and hot water discharge paths, the lever configured to control a type of supply of available water, an available water discharge path configured to discharge available water, a mixing ratio of cold and hot water of which varies according to an operation mode of the lever, to the lower basin, cold and hot water connection paths configured to connect the cold and hot water supply paths with the available water discharge path, and a control plate configured to be rotated within a predetermined angular range in a horizontal direction in conjunction with an operation of the lever; and
the control plate includes cold and hot water agitating grooves configured to selectively allow and block connections between the cold and hot water supply paths and the cold and hot water discharge paths and a main agitating groove configured to allow available water to flow toward the available water discharge path.

5. The two-layer vanity unit of claim 2,
wherein the lower vanity unit is configured in a location-adjustable form in which a location of the lower vanity unit is adjustable inside the cabinet in a vertical direction.

6. The two-layer vanity unit of claim 1, wherein:
the upper vanity unit includes an upper basin configured to store and discharge water and the faucet is an upper faucet configured to supply available water to the upper basin:
the upper faucet includes cold and hot water supply paths, cold and hot water discharge paths, the lever configured to control a type of supply of available water, an available water discharge path configured to discharge available water, a mixing ratio of cold and hot water of which varies according to an operation mode of the lever, to the upper basin, cold and hot water connection paths configured to connect the cold and hot water supply paths with the available water discharge path, and a control plate configured to be rotated within a predetermined angular range in a horizontal direction in conjunction with an operation of the lever; and
the control plate includes cold and hot water agitating grooves configured to selectively allow and block connections between the cold and hot water supply paths and the cold and hot water discharge paths and a main agitating groove configured to allow available water to flow toward the available water discharge path.

7. The two-layer vanity unit of claim 1, wherein:
the lower vanity unit includes a lower basin configured to store and discharge water and the faucet is a lower faucet configured to supply available water to the lower basin;
the lower faucet includes cold and hot water supply paths, cold and hot water discharge paths, the lever configured to control a type of supply of available water, an available water discharge path configured to discharge available water, a mixing ratio of cold and hot water of which varies according to an operation mode of the lever, to the lower basin, cold and hot, water connection paths configured to connect the cold and hot water supply paths with the available water discharge path, and, a control plate configured to be rotated within a predetermined angular range in a horizontal direction in conjunction with an operation of the lever; and
the control plate includes cold and hot water agitating grooves configured to selectively allow and block connections between the cold and hot water supply paths and the cold and hot water discharge paths and a main agitating groove configured to allow available water to flow toward the available water discharge path.

8. The two-layer vanity unit of claim 1,
wherein the lower vanity unit is configured in a location-adjustable form in which a location of the lower vanity unit is adjustable inside the cabinet in a vertical direction.

* * * * *